No. 610,978. Patented Sept. 20, 1898.
A. & J. SMITH.
GATE.
(Application filed Apr. 23, 1898.)
(No Model.)
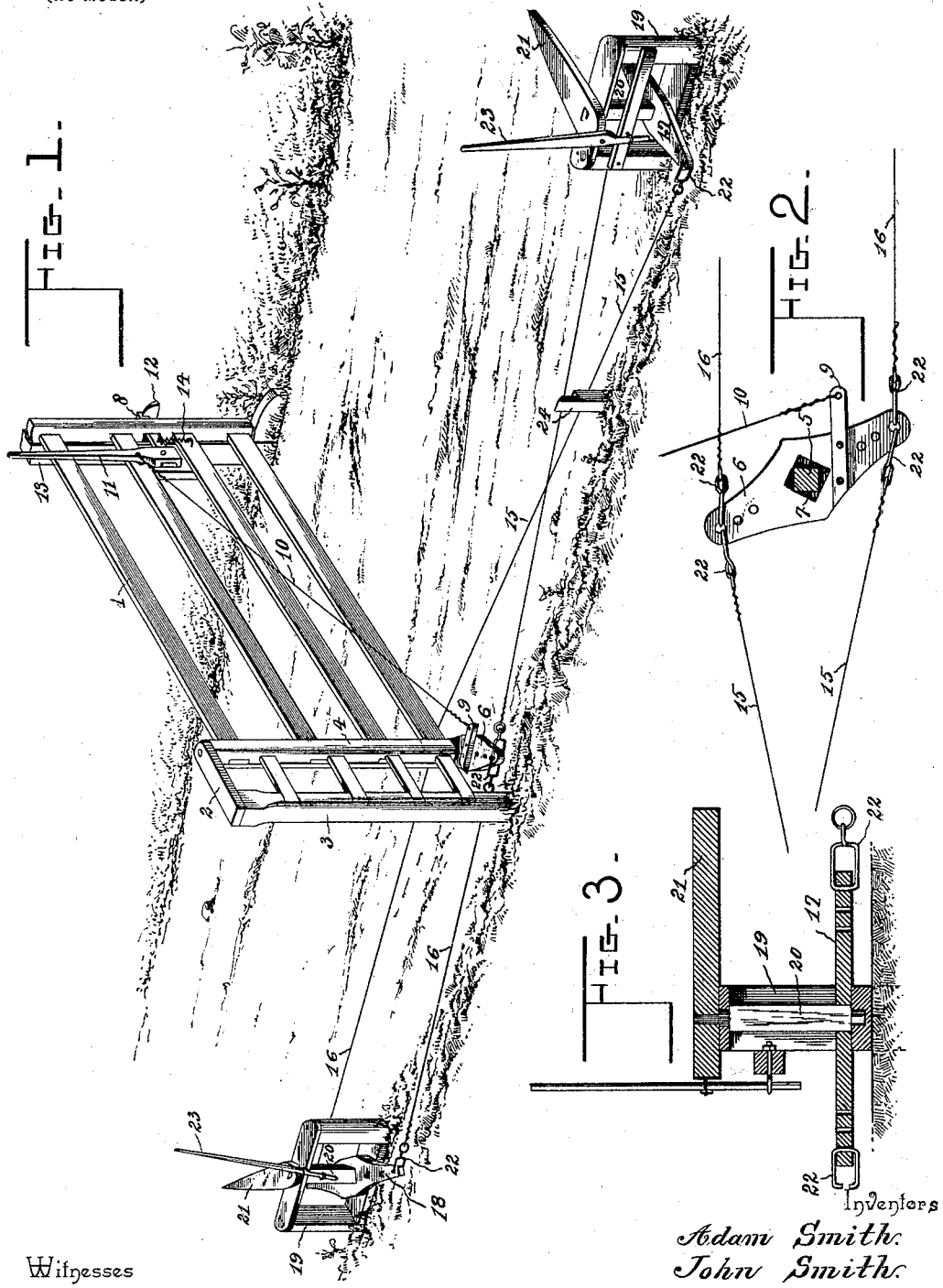
Witnesses
Inventors
Adam Smith.
John Smith.
By their Attorneys,

UNITED STATES PATENT OFFICE.

ADAM SMITH AND JOHN SMITH, OF ASHLEY, ILLINOIS.

GATE.

SPECIFICATION forming part of Letters Patent No. 610,978, dated September 20, 1898.

Application filed April 23, 1898. Serial No. 678,605. (No model.)

*To all whom it may concern:*

Be it known that we, ADAM SMITH and JOHN SMITH, citizens of the United States, residing at Ashley P. O., in the county of Washington and State of Illinois, have invented a new and useful Gate, of which the following is a specification.

The invention relates to improvements in gates.

The object of the present invention is to improve the construction of swinging gates and to provide means for operating them at a distance, so that a gate may be readily opened and closed without dismounting from a horse or leaving a vehicle.

The invention consists in the construction and novel combination and arrangement of parts, as hereinafter fully described, illustrated in the accompanying drawings, and pointed out in the claims hereto appended.

In the drawings, Figure 1 is a perspective view of a swinging gate constructed in accordance with this invention. Fig. 2 is a horizontal sectional view of the central portion of the operating mechanism, illustrating the manner of connecting the same with the gate. Fig. 3 is a vertical sectional view of one of the operating devices.

Like numerals of reference designate corresponding parts in the several figures of the drawings.

1 designates the swinging gate, provided at its inner end with upper and lower pintles or journals, the lower one being stepped in a suitable bearing and the upper one being arranged in a bearing-opening of an arm 2 of a post 3; but the gate may be hinged in any other suitable manner. The gate is provided at the lower end of its inner bar 4 with a polygonal portion 5, preferably square and receiving a lever 6, which has a central opening for the polygonal portion 5, such opening 7 being sufficiently larger than the polygonal portion to permit the lever 6 to have a limited swing independently of the gate for the purpose of operating a latch 8 before swinging the gate.

The central lever 6, which is disposed at a slight angle to the gate, is provided at its rear portion with an arm 9, extending outward at an angle to the lever 6 and connected by a cord 10 or other suitable flexible connection with an arm 11 of the latch 8. The arm 11, which is arranged at right angles to the latch, is extended upward and shaped into a handle, so that it may be readily operated by a person on horseback. The latch, which extends through an opening of the front end of the gate, is fulcrumed at the angle formed by it and the arm 11, and it is held in engagement with a keeper 12 of a latch-post 13 when the gate is closed by a spiral spring 14, secured to the latch and to one of the rails of the gate.

The central lever 6 is connected by wires 15 and 16 with end levers 17 and 18, whereby when the end levers are oscillated the gate will be operated. Each end lever is arranged in a supporting frame or stand 19 and is fixed to the lower end of a vertical shaft 20, and the vertical shaft carries an operating-lever 21, mounted on its upper end at the top of the supporting-frame 19. The supporting-frame 19 is rectangular, consisting of upper and lower horizontal bars and vertical pieces, and the levers 6, 17, and 18 are provided with perforations adapted to receive clevises 22, whereby the wires 15 and 16 are adjustably connected with the levers. The clevises 22 are also connected with the ends of the wires by links, and the length of the wires may be varied so that they will be taut when adjusted.

The wires 15 are crossed, and the wires 16 connect the corresponding ends of the levers 6 and 18. By this arrangement the operating-levers move simultaneously toward and from the gate and are adapted to be engaged by a wheel of a vehicle. When one of the operating-levers is moved toward the gate by a vehicle, the gate is opened, and the closing of the gate is effected by swinging the other operating-lever away from the same.

Each operating-lever is connected with a hand-lever 23, fulcrumed at its lower end on the frame 19 and extending above the operating-lever, so that it may be readily grasped by a person on horseback.

When the gate is opened, it abuts against a short post 24, which limits its swing and prevents the operating mechanism from being strained.

The invention has the following advantages: The operating mechanism is simple and comparatively inexpensive in construction, and, while it is positive and reliable in operation, it is adapted to be readily applied to any ordinary swinging gate. The operating-levers, which are tapering, are adapted to be actuated by the wheels of vehicles, so that it is unnecessary for a driver to release the reins or change his position to open and close the gate.

Changes in the form, proportion, and minor details of construction may be resorted to without departing from the spirit or sacrificing any of the advantages of this invention.

What we claim is—

1. The combination of a swinging gate provided with a latch, a lever mounted on the pivot of the gate at the inner end thereof, extending from the same in opposite directions and having a limited movement thereon, said lever being connected with the latch of the gate, vertical shafts journaled in suitable bearings and located at opposite sides of the gate, the levers 17 and 18 mounted on the vertical shafts and projecting from opposite sides thereof, the crossed connections extending from the ends of the lever 17 to the ends of the lever of the gate, the parallel connections extending from the ends of the lever of the gate to the ends of the lever 18, and the horizontal operating-levers connected with the vertical shafts and arranged to be engaged by the wheels of vehicles, substantially as described.

2. The combination of a swinging gate provided with a latch, a lever mounted on the pivot of the gate at the inner end thereof, extending from the same in opposite directions and having a limited movement thereon, said lever being connected with the latch of the gate, vertical shafts journaled in suitable bearings and located at opposite sides of the gate, the levers 17 and 18 mounted on the vertical shafts and projecting from opposite sides thereof, the crossed connections extending from the ends of the lever 17 to the ends of the lever of the gate, the parallel connections extending from the ends of the lever of the gate to the ends of the lever 18, the horizontal operating-levers connected with the vertical shafts and arranged to be engaged by the wheels of vehicles, and the vertically-disposed hand-levers fulcrumed at their lower ends and connected with the horizontal levers, substantially as described.

In testimony that we claim the foregoing as our own we have hereto affixed our signatures in the presence of two witnesses.

ADAM SMITH.
JOHN SMITH.

Witnesses:
JOHN F. BEAL,
JAMES M. PACE.